United States Patent [19]

Seki et al.

[11] Patent Number: 4,640,628

[45] Date of Patent: Feb. 3, 1987

[54] COMPOSITE FIRE SENSOR

[76] Inventors: Hiroshi Seki, 2265 Kamihongo, Matsudo-shi, Chiba-ken; Ryuichiro Kataishi, 108-13, Ishiharada-machi, Kashihara-shi, Nara-ken, both of Japan

[21] Appl. No.: 753,987

[22] Filed: Jul. 11, 1985

[30] Foreign Application Priority Data

| | | | |
|---|---|---|---|
| Jul. 11, 1984 | [JP] | Japan | 59-104650[U] |
| Sep. 10, 1984 | [JP] | Japan | 59-137114[U] |
| Oct. 20, 1984 | [JP] | Japan | 59-159000[U] |
| Oct. 20, 1984 | [JP] | Japan | 59-159013[U] |

[51] Int. Cl.[4] ........ G01K 3/00

[52] U.S. Cl. ........ 374/141; 340/628; 340/577; 340/578; 340/634; 374/121

[58] Field of Search ........ 374/121, 123, 141, 161, 374/164, 178; 340/577, 578, 579, 628, 634; 116/5, 101

[56] References Cited

U.S. PATENT DOCUMENTS

| | | | |
|---|---|---|---|
| 3,865,550 | 2/1975 | Bott et al. | 73/23 |
| 3,882,477 | 5/1975 | Mueller | 340/628 |
| 3,990,518 | 11/1976 | Hemme | 340/577 |
| 4,005,754 | 2/1977 | Linden et al. | 340/628 |
| 4,013,943 | 3/1977 | Chou et al. | 340/634 |
| 4,088,986 | 5/1978 | Boucher | 340/634 |
| 4,254,414 | 3/1981 | Street et al. | 340/628 |
| 4,305,069 | 12/1981 | Machan et al. | 340/628 |
| 4,319,229 | 3/1982 | Kirkor | 340/577 |
| 4,351,181 | 9/1982 | Currans | 340/634 |
| 4,455,487 | 6/1984 | Wendt | 340/578 |

FOREIGN PATENT DOCUMENTS

| | | | |
|---|---|---|---|
| 0112492 | 7/1984 | European Pat. Off. | 340/634 |
| 59-195784 | 11/1984 | Japan . | |

*Primary Examiner*—Charles Frankfort
*Assistant Examiner*—Thomas B. Will
*Attorney, Agent, or Firm*—Fleit, Jacobson, Cohn & Price

[57] ABSTRACT

A composite fire sensor comprising a first sensor element sensitive to a change in incident infrared rays, a second sensor element having a variable electric conductivity according to gas absorption/desorption, at least one comparator for combining the outputs of the first and second sensor elements, and a delay circuit for delaying the output of at least one of the comparators. Predetermined reference voltages are supplied to the comparators.

6 Claims, 13 Drawing Figures

FIG. 1
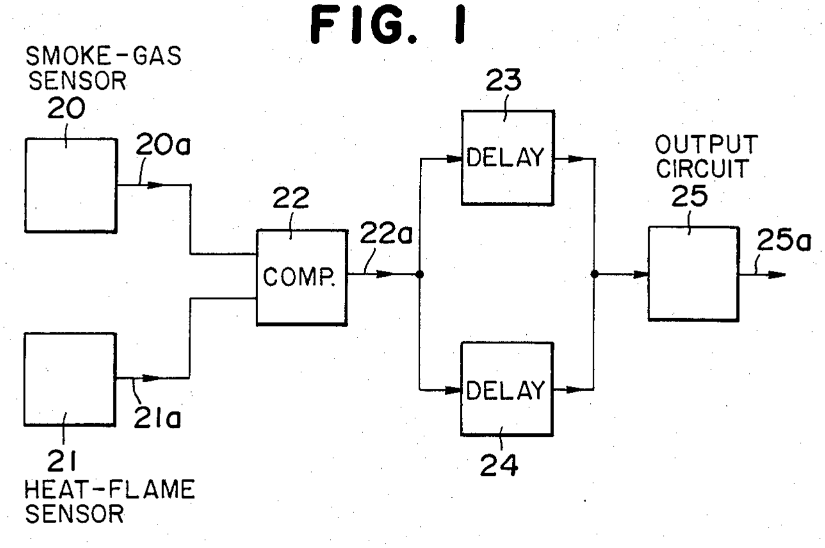
FIG. 2-I
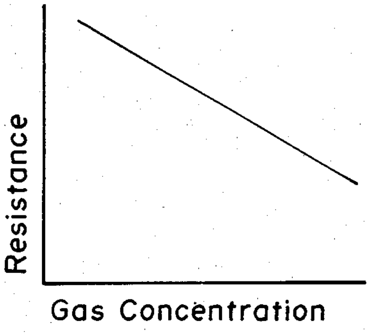
FIG. 2-II (a)
FIG. 2-II (b)
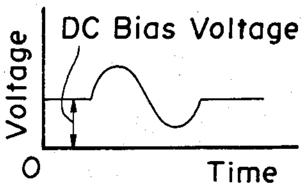
FIG. 9 (PRIOR ART)
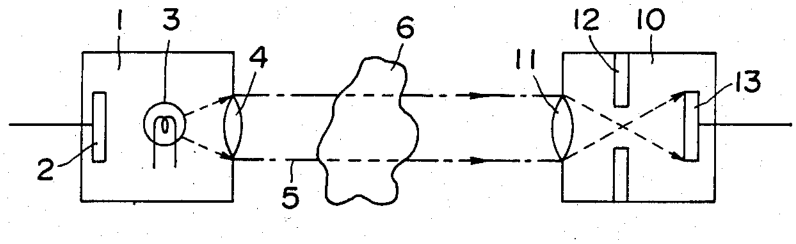

COMPOSITE FIRE SENSOR

BACKGROUND OF THE INVENTION

The present invention relates to a composite fire sensor operable in response to fire phenomena such as flame, heat, smoke and gas.

Fire sensors used in Japan (i.e., fire sensors recognized by the Fire Prevention Law in Japan) are of two kinds, heat sensors and smoke sensors. The heat sensors are of constant temperature type, differential type, compensation type, etc. Constant temperature type and differential type heat sensors employ a bimetal, which consists of a metal of a low thermal expansion coefficient and a metal of a high thermal expansion coefficient, these metals being bonded to each other. The bimetal is secured at one end, and when it receives heat, it is curved toward the low thermal expansion coefficient metal, that is, its free end is displaced in proportion to temperature change. The sensor thus operates such that a switch is closed when a constant temperature is reached by the bimetal temperature.

The smoke sensors are of photoelectric type and ion type. The former photoelectric type smoke sensors include light reduction type and scattering type smoke sensors. FIG. 9 shows a light reduction type smoke sensor. Its light-emitting section 1 includes a light source 3, a lens 4 and a light-receiving element 2 for compensating for light intensity reduction of the light source. Its light-receiving section 10 is disposed at a suitable distance from the light-emitting section 1 and includes a lens 11, a throttle 12 and a light-receiving element 13. When smoke 6 comes to the light path 5 emitted from the light-emitting section 1, the dose of light incident on the light-receiving element 13 is reduced by an amount proportional to the amount of smoke present in the light path. When the dose of incident light is reduced to a predetermined value, the sensor is actuated. The flame sensors have a purpose of early detection of fire, and are recognized as fire sensors by the UL Standards in U.S.A. and the NFPA. This type of fire sensors include ultraviolet sensors and infrared sensors and also include visible light sensors proposed earlier by the applicant, which can detect both flame and smoke with a single sensor element (Japanese Patent Application NO. 58-69,752).

The gas sensors typically include contact combustion type sensors and semiconductor type sensors. The semiconductor type sensor utilizes variation of the electic conductivity of semiconductor with a phenomenon of gas absorption taking place on the surface of a metal oxide (e.g., $SnO_2$ and ZnO). FIG. 10 shows the structure of a gas sensor. As shown, it has electrodes 15 embedded in a metal oxide semiconductor piece 16. One of the electrodes is used as a heater, while the other electrode is used for measuring the electric resistance of the portion of the semiconductor between the two electrodes. The heater is provided to heat the sensor to a temperature (200° to 400° C.) at which the gas adsorption and desorption can readily take place on the surface of semiconductor. The prior art sensors for sensing heat, smoke, flame and gas as noted above, however, only serve the respective roles independently, and there is no relation at all among them.

SUMMARY OF THE INVENTION

An object of the present invention is to provide a simplified composite fire sensor, which can sense heat, smoke, flame and gas and can be employed in general home.

According to the invention, there are provided a first sensor element consisting of a pyroelectric infrared detector (hereinafter referred to as "pyroelectric element" for simplification only) sensitive to a change in incident infrared rays, a second sensor element consisting of a semiconductor and having a variable electric conductivity according to gas absorption desorption phenomena and a comparator for combining the outputs of the first and second sensor elements, the first sensor element being sensitive to heat and flame, the second sensor element being sensitive to smoke and gas, the outputs of these sensor elements being led to the comparator to produce an alarm output.

BRIEF DESCRIPTION OF THE DRAWINGS

FIG. 1 is a block diagram showing an embodiment of the invention;

FIGS. 2-I, 2-II(*a*) and 2-II(*b*) are graphs for explaining the operation of a semiconductor element and a pyroelectric element;

FIG. 9 shows a conventional light reduction type sensor; and

PREFERRED EMBODIMENTS OF THE INVENTION

Figure 3:
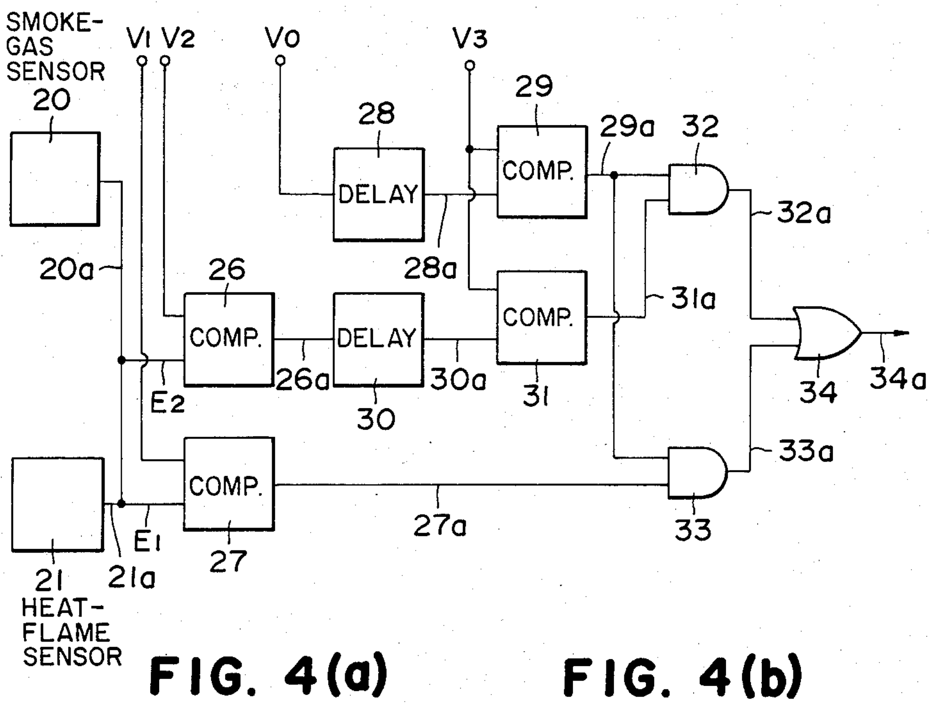
FIG. 3 is a schematic representation of another embodiment of the invention employing a plurality of comparators.

Preferred embodiments of the invention will be described with reference to the drawings.

FIG. 1 shows one embodiment. In this instance, the output of a first sensor element serves as a reference voltage of a comparator. Referring to FIG. 1, reference numeral 20 designates a semiconductor element as a second sensor element for sensing smoke and gas, and numeral 21 a pyroelectric element as a first sensor element for sensing heat and flame. The output 20*a* of the semiconductor element 20 and the output 21*a* of the pyroelectric element 21 are led to a comparator 22, and the output 22*a* thereof is led to delay circuits 23 and 24. The delay circuit 23 is provided to prevent an erroneous alarm that might otherwise be produced at the time of the connection or momentary disconnection of power source, while the delay circuit 24 is provided for eliminating alarms that might otherwise be produced by gas generated for short periods of time at the time of cooking or using a spray or the like. The delay circuits 23 and 24 consist of respective resistors and capacitors providing different time constants. Reference numeral 25 designates an output circuit for driving a buzzer or like acoustic unit, that is, its output signal 25*a* is used to drive an acoustic unit (not shown) for alarming.

In operation, when smoke or gas touches the semiconductor element 20 consisting of an oxide semiconductor (i.e., $SnO_2$), the electric resistance of the element 20 is reduced since it is heated by a heater (not shown) embedded in it to approximately 200° C. With the reduction of the electric resistance, the output 20*a* of the element 20, which is fed to the comparator 22, is reduced. Assuming the output 21*a* of the pyroelectric element 21 to be constant (when neither flame or heat is generated), with an increase of the output 20*a* of the semiconductor element 20 to be above a setting voltage of the comparator 22, an output 22*a* is produced therefrom. (When the semiconductor 20, which is held at a high temperature by the heater, contacts smoke or gas, its electric resistance is reduced as shown in FIG. 2-I).

Meanwhile, the pyroelectric element 21 has surface charge which is essentially based on the self-polarization. However, the charge is neutralized by floating charge in air, so that no charge is observed. When flame or heat is generated in the absence of smoke or gas, the surface of the pyroelectric element 21 in the state noted above is irradiated by infrared rays (i.e., heat rays) due to the generated flame or heat. As a result, charge is absorbed to increase the temperature of the pyroelectric element 21. The degree of self-polarization is reduced with increasing temperature. That is, the degree of self-polarization of the pyroelectric element 21 is momentarily changed with a temperature change. However, it takes a certain period of time until a surface charge equilibrium is gained, i.e., a non-equilibrium state is held for a while. The amount of surface charge corresponding to the degree of non-equilibrium is detected as a corresponding voltage. For example, when heat is incident on the pyroelectric element 21 as shown in FIG. 2-II(*a*), the output thereof is as shown in FIG. 2-II(*b*). When there is no change in the temperature of the pyroelectric element 21, the output voltage thereof consists of a sole DC bias voltage shown in FIG. 2-II(*b*). This voltage is referred to as reference voltage of the comparator 22. It is of course that when the temperature is changed gently, the output signal also is changed gently so that the comparator 22 provides no output. Thus, the output 22*a* is produced when the DC bias voltage is changed greatly beyond a certain predetermined extent.

Further, when the flame, heat, smoke, and gas are sensed simultaneously, the present voltage 21*a* is changed greatly to increase the output 20*a* of the semiconductor element 20, so that the comparator 22 produces the output 22*a*.

FIG. 3 shows another embodiment, in which a plurality of comparators are used in addition to delay circuits 28, 30 in order that the sensor will not respond to the connection of the power source or to momentary gas generation.

Figure 4A:
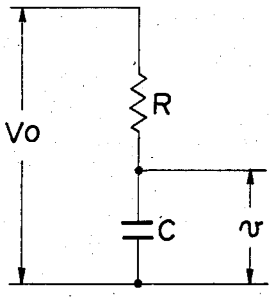
FIGS. 4(*a*) and 4(*b*) are views for explaining a delay circuit and an operating characteristic thereof.
Figure 4B:
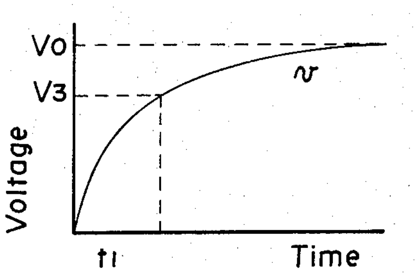
Figure 10:
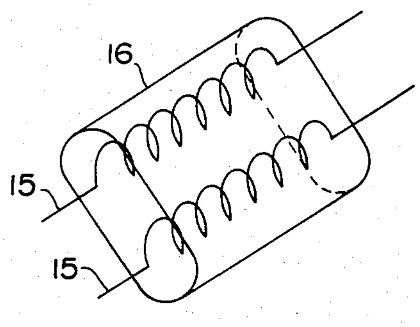
FIG. 10 (PRIOR ART)
FIG. 10 shows a conventional semiconductor gas sensor.

In this instance, semiconduictor element 20 and pyroelectric element 21 are connected to respective comparators 26 and 27, which have supply voltages V1 and V2, respectively. The supply voltages have a relation of V1 V2. The comparators 26 and 27 provide outputs 26*a*, 27*a* when E2 is greater than V2 ($E_2 > V_2$) and when E1 is greater than V1 (E1 > V1), respectively. The resistance of the semiconductor element 20 is reduced by smoke or gas, but the output 20*a* is increased by a resistor voltage divider (not shown). The semiconductor element 20 has such a character that with a voltage applied to it when it is in a non-energized state, its resistance is sharply reduced simultaneously with the start of current conduction and requires a certain initial stabilization time until the resistance is increased to a level corresponding to the ambient atmosphere. The output 26*a* or 27*a* appears according to the extent of reduction of the resistance. A delay circuit 28 is provided in order to prevent this. This delay circuit 28 has a DC voltage $V_0$, i.e., the voltage $V_0$ is applied to the delay circuit 28 when a power source switch (not shown) is closed. The delay circuit 28 may have a construction as shown in FIG. 4(*a*), consisting of a resistor R and a capacitor C. When the voltage $V_0$ is applied, the terminal voltage across the capacitor C is developed as shown in FIG. 4(*b*). The output 28*a* of the delay circuit 28 shown in FIG. 3 has the level of the voltage $v$. Reference numeral 29 designates a comparator with a setting voltage V3. The comparator 29 provides an output 29*a* when the voltage $v$ exceeds the setting voltage V3, that is, after instant ti, FIG. 4(*b*). R and C may be suitably selected depending on the characteristics of the semiconductor element 20. Reference numeral 30 designates an RC delay circuit like that shown in FIG. 4(*a*), and numeral 31 a comparator.

The comparator 31 provides an output 31*a* when the output 30*a* of the delay circuit 30, which is produced in response to the output 26*a* of the comparator 26 exceeds its reference voltage level. Reference numeral 32 designates an AND gate, which provides an AND output 32*a* when the outputs 29*a* and 31*a* are fed simultaneously. Accordingly, the delay circuit 28 is provided for preventing erroneous operation of the element until the initial stabilization thereof. Thus, it is possible to eliminate erroneous operation at the time of the connection and disconnection of the power source. The delay circuit 30 serves to prevent erroneous operation due to gas or smoke generated for a short period of time. The delay circuit 30, comparator 29 and AND gate 32 form a sort of conditional circuit to control the output 32*a*. Actually, however, there may occur an occasion in which a great amount of gas or the like issues in a short period of time. In such a case, it is likely that the comparator 32 does not produce the output 32*a* due to the delay circuit 30 providing a delay time, during which the gas is dispersed. Also, in such case as when flame or heat is being generated abnormally steadily, its change cannot be taken out due to the pyroelectric element 21. In such an occasion, the delay circuit 30 is rather undesired, although it is effective in case of a gradually spreading fire. For this reason, the output 27*a* of the comaprator is coupled without agency of any delay circuit but directly to an AND gate 33. Here, the delay circuit 28, comparator 29 and AND gate 33 form a conditional circuit to control output 33*a*, similar to the one noted above. Reference numeral 34 designates an OR gate, which provides an output 34*a* when the output 32*a* or 33*a* or both of them is produced.

Figure 5:
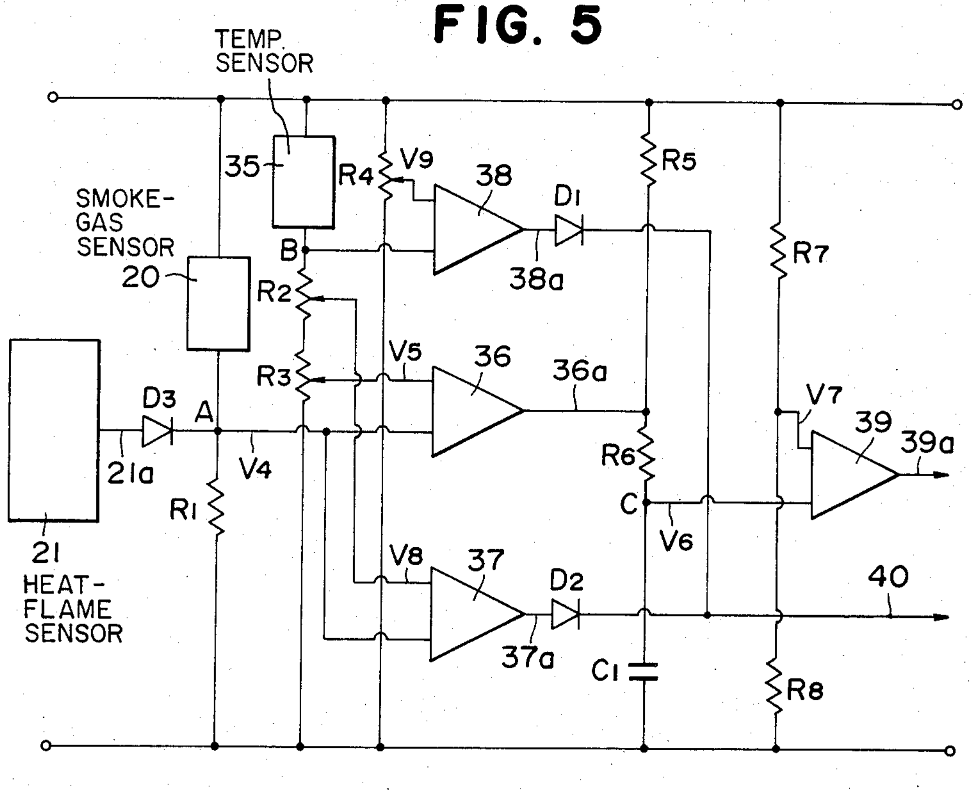
FIG. 5 is a schematic representation of a further embodiment of the invention employing a temperature compensation element.

FIG. 5 shows a further embodiment of the invention, in which the semiconductor element is not influenced by seasonal or like changes in the ambient temperature. Referrence numeral 35 designates a sensor element for temperature compensation consisting of a thermistor. Reference symbols R1 to R8 designate resistors (the resistors R2, R3 and R4 being variable resistors), symbol C1 a capacitor, and symbols D1 to D3 diodes. Reference numerals 36 to 39 designate comparators.

Figure 6:
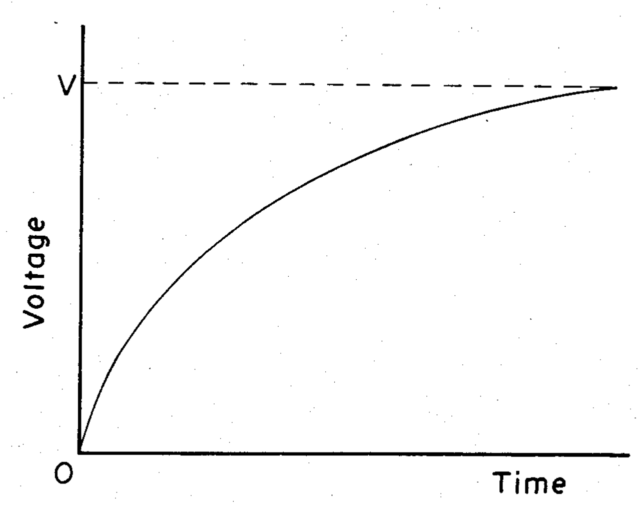
FIG. 6 is a graph showing an operating characteristic of a delay circuit.

When smoke or gas touches semiconductor element 20, the electric conductivity thereof is increased due to absorption/desorption reactions of gas with the surface thereof. With this reduction of the resistance, electric potential V4 at point A is increased to a level determined by the semiconductor element 20 and resistor R1. The reference voltage of the comparator 36 is set to a desired level V5 by the variable resistor R3. When the voltage V4 exceeds the voltage V5, the comparator 36 produces an output 36*a*. Since the resistor R6 and capacitor C1 form a delay circuit, the voltage V6 is varied in the manner as shown in FIG. 6. The output 39*a* of the comparator 39 may be delayed by feeding the voltage V6 to the separate comparator 39, the reference voltage V7 of which is suitably set by the resistors R7 and R8. This function is provided for eliminating unnecessary alarm due to gas generated at the time of using a spray or cooking or smoke of tobacco. In such case as when a great amount of quickly issuing gas is dispersed, although the voltage V4 is quickly increased, the output 39*a* is not immediately produced due to the delaying effect of the resistor R6 and capacitor C1. This is liable to lead to a grave accident. Accordingly, the voltages V8 and V5 are set by the resistors R2 and R3 such that voltage V8 is greater than voltage V5 (V8>V5), and when a condition V4>V8 is met, the comparator 37 produces the output 37A so that the ouput 40 can be obtained without delay. In other words, when a great amount of gas or smoke is produced, an alarm circuit (not shown) is immediately operated.

Figure 7:
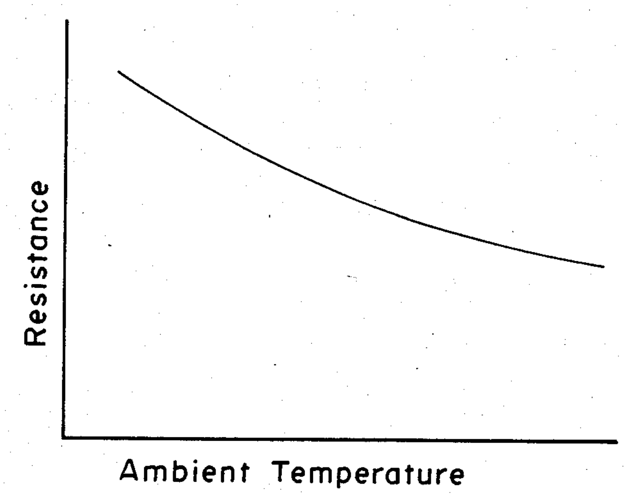
FIG. 7 is a graph showing a resistance versus temperature characteristic of a temperature sensing element.

The semiconductor element 20 is susceptible to the ambient temperature. For example, in case of $SnO_2$, with ambient temperature rise (in summer, for instance), the resistance of the element is reduced as shown in FIG. 7. Where the reference voltages of the comparators 36 and 37 are fixed, in the summer when the ambient temperature is increased the voltage V4 is increased to increase the sensitivity of the element, so that an erroneous alarm is liable to result from the generation of the output 36*a* in the absence of smoke or gas. A sensor element 35 for temperature compensation is provided to provide compensation for the influence of the ambient temeprature. When a thermistor which has a negative resistance versus temperature characteristic is used, which charcteristic is similar to that of the semiconductor element 20, the resistance is reduced with increasing temperature. With an increase of the ambient temperature, the voltage V4 is increased to increase the potential at point B, thus increasing the voltages V5 and V8. Ambient temperature compensation, thus can be obtained substantially by appropriately selecting the characteristic of the sensor element 35.

In the event of a fire, poisonous gases and smoke are usually generated so that the semiconductor element 20 is operated. However, the element 20 may fail to be operated when the concentration of smoke or gas is low due to influence of wind or because the fire is at a neighbor. However, as the temperature is increased by heat of fire, the resistance of the sensor element 35 for temperature compensation is reduced as described above, thus increasing the electric potential at point B. If the reference voltage V9 of the comparator 38 is appropriately set by the resistor R4 by considering environmental conditions, for instance such that the output 38*a* is produced upon reaching of a temperature of 60° C., the ouput 40 is produced as soon as the temperature exceeds 60° C. The diodes D1 to D3 serve to ensure stable operation of the comparators 36 to 38.

Figure 8:
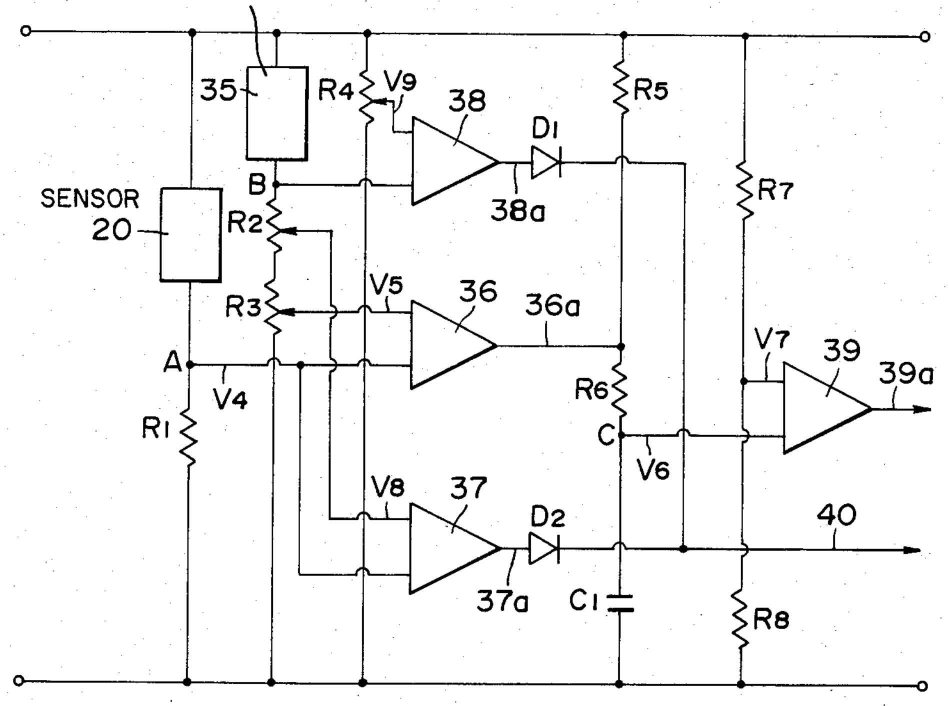
FIG. 8 is a schematic representation of a further embodiment without a pyroelectric element.

FIG. 8 shows a further embodiment of the invention, which is a simplified composite fire sensor without the pyroelectric element in the embodiment shown in FIG. 5 and capable of sensing three phenomena of heat, smoke and gas. Of course flame and excessive heat may be detected by connecting point A in FIG. 8 to the pyroelectric element 21 and diode D3 shown in FIG. 5.

In the embodiment of FIG. 8, the output of semiconductor sensor element is led to first and second comparators for comparing it with respective reference levels, the output of a temperature compensation sensor element for compensating for a change of the electric conductivity of semiconductor sensor element with an ambient temperature change thereof, the output of third comparator is combined with the output of the second comparator, and the reference voltage of the first comparator is set to be lower than the reference voltage of the second comparator.

The temperature compensation sensor element 35 consists of a thermistor having a negative resistance versus temperature characteristic resembling that of the semiconductor element 20. Thus, the resistance of the element 20 is reduced with increasing temperature. With an increase of the ambient temperature, the voltage V4 is increased to increase the potential at point B so as to increase the voltages V5 and V8. Ambient temperature compensation thus can be obtained by selecting an optimum characteristic of the sensor element 35. In this embodiment, the thermistor, which is necessary for the detection of gas and smoke without error and with high accuracy, is utilized for the detection of heat generated at the time of a fire. The reference voltage V5 of comparator 36 is set to a desired level by variable resistor R3. When the voltage V4 exceeds the voltage V5, the comparator 36 produces an output 36*a*. In this instance, resistor R6 and capacitor C1 form a delay circuit, and the output 39*a* of comparator 39 which receives the variable voltage V6 may be delayed by a desired period of time by appropriately setting the reference voltage V7 of the comparator 39 by resistors R7 and R8. This function is provided for eliminating erroneous operation due to gas generated at the time of using a spray or cooking or to smoke of tobacco For a case when a great amount of gas issues quickly, the voltages V5 and V6 are set by resistors R2 and R3 such that the voltage V8 is greater than the voltage V5 (V8>V5). As soon as the condition V4>V8 is met, the comparator 37 produced without delay. That is, when a great amount of gas or smoke is generated, an alarm is produced immediately. In this embodiment, the sensor element for the ambient temperature compensation necessary for the semiconductor element for detecting gas and smoke can also serve as an element for detecting heat, that is, no exclusive sensor element to this end is needed, so that the construction can be simplified.

As has been desired in the foregoing, the composite fire sensor according to the invention has a combination of a semiconductor element and a pyroelectric element, these being inexpensive elements, and suitable numbers of comparators and delay circuits, and can reliably detect smoke, gas, flame, heat, etc. without being influenced by the temperature of the place where it is installed and with a very low possibility of erroneous operation. Besides, its circuit construction is simple and it can be provided as a compact unit suited for general dwelling. Further, a sensor element consisting of a thermistor for temperature compensation can be incorporated in the circuit for simply compensating for seasonal temperature changes and also being used for the detection of a constant heat level at the time of a fire.

Although the present invention has been described with reference to the preferred embodiments, many modifications and alterations can be made within the spirit of the invention.

What is claimed is:

1. A composite fire sensor comprising a first sensor element sensitive to a change in incident infrared rays, a second sensor element having a variable electric conductivity according to gas absorption/desorption, said first sensor element being sensitive to heat and flame, said second sensor element being sensitive to smoke and gas and both producing outputs, at least one comparator means for combining the outputs of said first and second sensor elements, said at least one comparator means adapted to change its sensitivity to produce an alarm output in response to said outputs of said first and second sensor elements, and a delay circuit for delaying said alarn output of said at least one comparator means, wherein predetermined reference voltages along with the output of the first and second sensor elements are fed to said comparator means to produce said alarm output.

2. The composite fire sensor according to claim 1, wherein said first sensor element is a pyroelectric element.

3. The composite fire sensor according to claim 1, wherein said second sensor element is a semiconductor element.

4. The composite fire sensor according to claim 1, wherein the reference voltage of said at least one comparator means is the output of said first sensor element.

5. The composite fire sensor according to claim 1, wherein said at least one comparator means includes a temperature compensation sensor element.

6. The composite fire sensor according to claim 5, wherein said temperature compensation fire sensor is a thermistor.

* * * * *